Dec. 1, 1959  E. WILDHABER  2,914,930
UNIVERSAL JOINT

Filed April 3, 1957  2 Sheets-Sheet 1

INVENTOR:
Ernest Wildhaber

Dec. 1, 1959  E. WILDHABER  2,914,930
UNIVERSAL JOINT
Filed April 3, 1957  2 Sheets-Sheet 2

INVENTOR:
Ernest Wildhaber

United States Patent Office 2,914,930
Patented Dec. 1, 1959

2,914,930

UNIVERSAL JOINT

Ernest Wildhaber, Brighton, N.Y.

Application April 3, 1957, Serial No. 650,473

18 Claims. (Cl. 64—21)

The present invention relates to universal joints for transmitting torque between two members whose axes intersect at an angle which may vary in operation, and where uniform motion of one member corresponds to uniform motion of the other of said two members. Such joints are known as constant-velocity universal joints.

In the type of universal joint referred to the said two members are an inner member and an outer member, both being provided with ways engaged by a torque-transmitting element carrying rollers or sliding blocks. Constant velocity is transmitted by maintaining the axis or axes of said rollers or blocks in the bisector plane of the axes of said two members.

One object of the present invention is to provide a compact constant-velocity universal joint of simplified design and moderate cost.

A further object of the present invention is to devise a constant-velocity universal joint in which torque is transmitted through an element having a pair of axially spaced inner rollers formed integral with it, or rigid therewith, and carrying rotatably mounted thereon a pair of outer rollers coaxial with said inner rollers, where the axis of said rollers and of said element is constrained by said outer rollers to intersect the axis of said inner member at a fixed point, and where said outer rollers may act as radial spacers between said two members to constrain their axes to intersect at that same point.

A related object is to devise a constant-velocity universal joint that requires no expensive fits.

A further aim is to provide an improved form of outer roller (or sliding block) that is supported by a bearing aligned with its working surface, and that is of mushroom-shape in an axial section. A related object is to devise a strong outer roller of mushroom shape, with a central stem, and having a convex spherical end surface and an opposite ring-shaped concave spherical end surface, to enable the roller to carry out the aforesaid centering constraints by engagement with the bottom of the ways of the outer member and with a spherical outside surface provided on the inner member.

Other objects are to provide improved control means for maintaining the roller axis in the bisector plane of the axes of the two members connected by the universal joint, and to provide improved contact between said control means and said torque-transmitting element.

Other objects will appear in the course of the specification and in the recital of the appended claims. These objects may be attained singly or in any combination.

Figure 1:
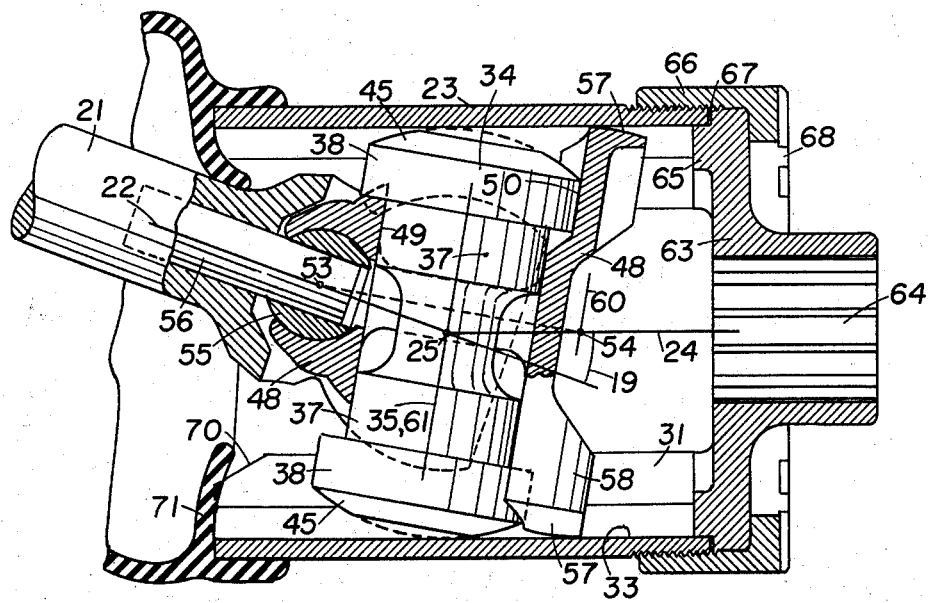
Fig. 1 is an axial section of a universal joint constructed according to the present invention, the joint being shown at angularity.
Figure 4:
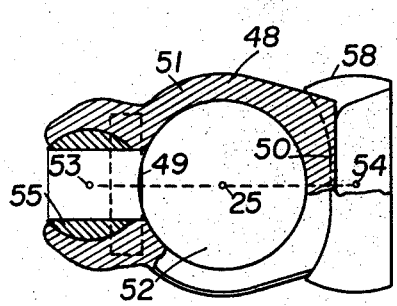
Fig. 4 shows the control part of said universal joint partly in plan view, partly in a section taken along dotted line 53—54 of Fig. 1.
Figure 2:
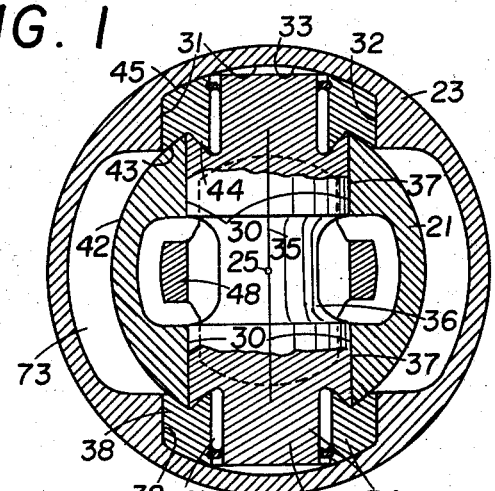
Fig. 2 is a cross-section corresponding to Fig. 1, showing the joint in alignment.

Referring to Figures 1 to 4, the two members connected by the universal joint are an inner member 21 with axis 22 and an outer member 23 with axis 24. The axes 22, 24 intersect at 25 and form an angle 19 with each other which may vary in operation. The inner member 21 has a head 26 (Fig. 3) transformed into a fork by a slot 27. The plane sides 28 of the slot 27 form a pair of ways 30 (Fig. 2) whose sides are parallel to the axis 22 of inner member 21. Other ways 31 are formed on the outer member 23. Their sides 32 and bottoms 33 are parallel to the axis 24 of member 23.

The ways 30 and 31 are engaged by a rolling element 34 with axis 35. Element 34 comprises an inner portion 36 having two axially spaced cylindrical rolling portions 37 formed integral therewith, and adapted to engage the ways 30. A pair of outer rollers 38 are rotatably mounted on projections 40 of inner portion 36, as by needle bearings 41.

As known, uniform motion is transmitted between the two members 21, 23 when the roller axis 35 is maintained in the bisector plane of the axes 22, 24 of the members 21, 23 connected by the joint. This plane passes through the intersection point 25 of the axes 22, 24 and is equally inclined to both axes.

The intersection point 25 is fixed with respect to the inner member 21. It coincides with the center of its outside spherical portion 42. A constraint is used to keep the intersection point of the axes 22, 24 at that center 25. A further constraint is provided to keep also the roller axis 35 at this center. And the roller axis is further to be constrained to have the right inclination. That is the axis 35 of the rollers 37, 38 and element 34 should be equally inclined to both axes 22, 24, to lie in the bisector plane.

Ordinarily the second-named constraint is obtained with parts contacting the inside of inner member 21. This central space is however also take up by the control means that enforce the right inclination of axis 35. More central space is then needed to make room for both. This in turn increases the outside diameter of the universal joint.

The invention avoids such diameter increase and may combine the two first-named constraints. The outer rollers 38 have a larger diameter than the inner rollers 37. Each roller 38 has at its inner end a ring-shaped concave spherical portion 43 centered at 25. A hub portion 44 projects from it to provide long enough bearing support axially aligned with the working surface of the roller without sacrificing part of the length of the rollers 37. At its outer end each roller 38 has a convex spherical surface 45 also centered at 25. The concave spherical portion 43 contacts the spherical portion 42 of head 26 in two separate zones 46 (Fig. 3) formed by the roller periphery 38' on opposite sides of its ways (30). The outer spherical surface 45 of each roller 38 engages the bottom surface 33 of its way 31 of member 23. This bottom surface is a cylindrical surface coaxial with member 23. The outer rollers 38 thus represent radial spacers between the inner member 21 and the outer member 23, and maintain them in a fixed position in the direction of the roller axis 35, thereby centering them in that direction. Centering in a direction at right angles thereto (Fig. 2) is effected by the working contact of the rollers. Thus the axes 22 and 24 are constrained to intersect at 25. The contact zones 46 extend through large enough angles to also keep the roller axis 35 in place, so that it passes through the center 25 of the contacted spherical surface 42.

In addition to the above-said two constraints to keep the axes 22, 24 intersecting at point 25 and to keep the roller axis also passing through point 25, the rolling element 34 is to be constrained to have the required inclination, so that its axis 35 lies in the bisector plane. This is accomplished with rotatable control means 48, here a single part. Part 48 contains two plane surface portions 49, 50 straddling the rollers 37 and 38 respectively, to maintain the roller axis 35 in a central plane 61 parallel to planes 49, 50 and passing through point 25. These planes are perpendicular to the axis 53—54 of the control part.

Axis 53—54 is constrained to intersect the axis 22 of member 21 at point 53, and the axis 24 of member 23 at point 54.

The constraint at point 53 comprises a ball 55 mounted on a pin 56 rigidly secured to inner member 21, as by a press fit and further measures if desired. Ball 55 is axially slidable on pin 56 and may also turn thereon. The control part 48 contains an internal spherical socket portion engaging ball 55 to pivot about its center 53. The control part may be made of non-metal which can be moulded, and is then moulded about ball 55. It may also be made of metal that can be pressed and rolled about the ball to pivotally fit in to the ball. The use of a ball 55 slidable on a pin provides a bearing support directly at center 53.

The constraint at point 54 is through the spherical ends 57 (Fig. 1) of a pair of arms, the arms of part 48 that contain also the plane portions 50. These ends engage the cylindrical bottom surface 33 of the ways 31. The said arms also contain coaxial cylindrical side surfaces 58 having an axis 60 parallel to axis 35 and passing through point 54. Surfaces 58 engage the plane sides 32 of the ways 31. This contact of the side surfaces 58 further adds to the centering constraint. It also keeps the control part 48 properly turned under desirable contact conditions.

The two opposite portions that contain the plane surfaces 49, 50 are connected by a ring-shaped portion 51 (Fig. 4), that has a central hole or opening 52 large enough for the rollers 37 to pass through.

The center 53 of the spherical socket portion of the control part and center 54 have the same distance from the central plane 61 that contains the roller axis 35. Because of this equality the axis 53—54 includes equal angles 25—53—54 and 25—54—53 with the two axes 22 and 24. These angles are exactly one half of angle 19. And it follows that plane 61 is the bisector plane, as required.

Member 23 may be secured to a flange member 63 that contains internal splines 64 for further connection with a splined shaft. The connection between members 23 and 63 is through projections 65 that engage the sides of the ways 31 and act as integral keys. A nut 66 threads onto member 23 and keeps flange member 63 pressed against the rim of member 21. A gasket 67 is interposed between the members 23 and 63. Teeth 68 are provided on nut 66 for turning it.

The opposite end of outer member 23 may be flared, as shown at 70. A flexible seal 71 is bonded to this end, or otherwise secured thereto. The opposite end of the seal (not shown) is secured to a portion rigid with inner member 21.

Figure 3:
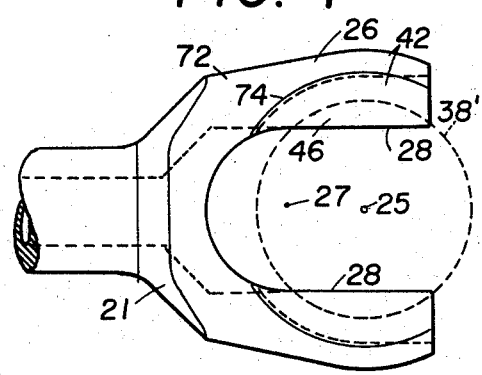
Fig. 3 is a plan view of the inner member of the universal joint shown in Figures 1 and 2.

Member 21 is shown in plan view in Fig. 3. It contains reinforcing backbones 72 which reach into the space 73 (Fig. 2) provided in outer member 23. Member 21 may be precision-forged, if desired. Only the plane sides 28 of slot 27 and the engaged portions of the spherical surface 42 then require machining, as a rule. These portions are contained on opposite sides within the circular arc 74 (Fig. 3), within reach of the moving roller periphery 38'.

Figure 5:
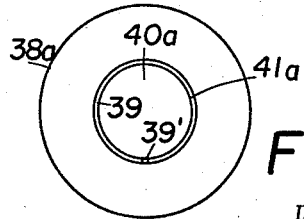
Fig. 5 is an end view of an outer roller, showing a sliding-type bearing substituted for the needle bearing shown in Fig. 2.

If desired plain bearings may be used for mounting the outer rollers. Thus roller 38a, Fig. 5, is rotatably mounted on stub shaft 40a by a plain bearing 41a. This bearing may have a suitable lining 39, which may be an insert of suitable non-metallic or metallic material, open at 39' and somewhat springy for convenient insertion.

Tapered inner rollers

An embodiment with tapered inner rollers will now be described with Figures 6 to 8. Because of their smaller distance from the axes 22, 24 the inner rollers carry more load than the outer rollers, to make up the same torque. Tapered rollers, and especially conical rollers 37' increase the load capacity because they provide true rolling contact with their ways 75 all along their profile length. Also their load leverage is larger.

The two members connected by the universal joint are an inner member 21' with axis 22 and an outer member 23' with axis 24. The axes 22, 24 intersect at 25. Both members are provided with ways 75, 76 respectively, each of which is symmetrical to a plane containing the axis of the respective member. The ways 75, 76 are engaged by a rolling element 77 which transmits torque between them. Element 77 comprises an inner portion 78 having two opposite and axially spaced conical rolling portions or rollers 37' formed integral with it. The working surfaces of these rollers are conical surfaces having a common apex at 25 on their common axis 35. The side surfaces of the ways 75 engaged thereby are themselves conical surfaces. They have a common axis perpendicular to the drawing plane of Fig. 6 and passing through point 25. They are the surfaces enveloped by the conical roller surface when the latter swings about center 25 as if in operation. The roller axis 35 thereby describes the drawing plane of Fig. 6, which is an axial plane containing axis 22 of member 21', and a plane of symmetry of the ways 75.

A pair of outer rollers 38' are rotatably mounted on portion 78 of element 77, as by needle bearings 80. The rollers 38' have cylindrical or approximately cylindrical working surfaces 81 that are adapted to engage the plane sides 82 of the ways 76. They contain each a spherical surface 45' for engagement with the bottom 33 of way 76. Each roller 38' further contains a tapered and ring-shaped concave spherical surface 43' adapted to engage portions of a convex spherical outside surface 42' provided on member 21'.

The rollers 38' have a novel cross-sectional shape 83 for supporting the load exerted on the working surface 81 with a bearing 80 that is axially aligned with the working surface. With this object in view the mushroom shape 83 provides maximum strength. It comprises a portion with working surface 81 adapted to engage the ways 76, a recess 84, and a central stem 85, the recess extending in a circle about the central stem. Stem 85 is cylindrical. It has a cylindrical outside surface 86 that serves as a bearing surface in needle bearing 80.

In other words, each roller 38' comprises a cup-shaped portion and a central stem projecting from the bottom of the cup shape. The journal or stem 85 is rigid with the roller, while the internal portion 87 of the bearing is rigid with portion 78, in structure where the inner end of stem 85 is closer to center 25 than the plane of the outmost circle of the working surfaces 37'. This arrangement is also applicable to sliding-block designs, with a similar result of improved strength.

The end surface of stem 85 may contact the bottom surface 88 of the bore 87.

The centering action is the same as described for the embodiment of Figures 1 to 4, except that in acting as a radial spacer between members 21' and 23' the roller 38' may receive the radial pressure chiefly through the bottom surface 88 rather than through surface 42'. The latter contact then serves mainly to align the roller axis 35 axially of the universal joint, so that it passes through point 25.

Also, if desired, centering pressure may be directly transmitted between members 21', 23' by slightly decreasing the diameter of the cylindrical inside surface 98 of member 23', so that it contacts the spherical outside surface 42' of member 21'. In this case the bottom 88 should be clear of the end of stem 85, and the contact of the spherical roller surfaces 43', 45' should be an easy running fit.

The roller axis 35 is kept at the required inclination by rotatable control means 48'. These control means act on the conical rollers 37' through an intermediate part 89 preferably made of mouldable non-metal. This part hugs opposite sides of the conical surfaces 37' and follows the inner portion 78. It may be made in two halves, for assembly. Or it may be moulded all around the inner portion 78 of element 77 and is then in one piece. In either case part 89 is kept free to turn about axis 35 of the rollers relatively thereto. On its outside part 89 contains plane surface portions 90, 90' that are parallel to each other and to axis 35. These portions are contacted by plane portions 91, 91' of the control means 48', straddling the rollers 37' and part 89. In this way surface contact is achieved, part 89 turning on axis 35 to adapt itself to the control part.

The latter may be made in two pieces 48a, 48b rigidly secured together, as by rivets 92. The two pieces contain the plane portions 91, 91' respectively, and are connected through a horseshoe part 93 of piece 48a. This leaves a central opening 94 for portion 78 and the central portion of part 89 to pass through. Opening 94 has a smaller width than the maximum diameter of the tapered rollers 37'. The portion 78 with rollers 37' and part 89 are introduced into opening 94, and the pieces 48a, 48b are then riveted together. They then form a unit inseparable without destruction.

If desired, the opening 94 may be made large enough for the large end of the conical rollers 37' to go through. In this case the control member 48' may be made in one integral piece.

Member 21' has a central recess 95 with parallel plane sides 96. Recess 95 provides space for the control part 48'. The sides 96 are preferably flared at their outer end.

The axis 53'—54' of the control part 48' is constrained to intersect the axes 22, 24 of the members 21', 23' at spaced points 53', 54'. The constraint at point 53' is similar to the one at point 53 of Fig. 1. A ball 55 with center 53' is slidably mounted on a pin 56' rigid with and coaxial with member 21'. The outside surface of the ball is pivotally engaged by a matching socket portion provided on the control part 48'. The constraint at point 54' is through the spherical outside surface 97 (Fig. 8) of part 48', engaging the cylindrical inside surface 98 provided on outer member 23'. Spherical surface 97 is centered at point 54.

The points 53', 54' are equally distant from the central plane of the control part 48', where the roller axis 35 lies. This constrains the right angular position of the roller axis, in the bisector plane of the axes 22, 24, and causes the joint to transmit uniform motion.

Figure 6:
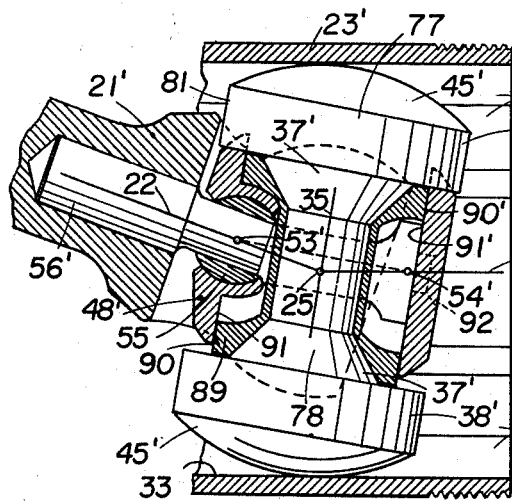
Fig. 6 is an axial section of a universal joint constructed according to another embodiment of the invention, showing the joint at angularity.
Figure 7:
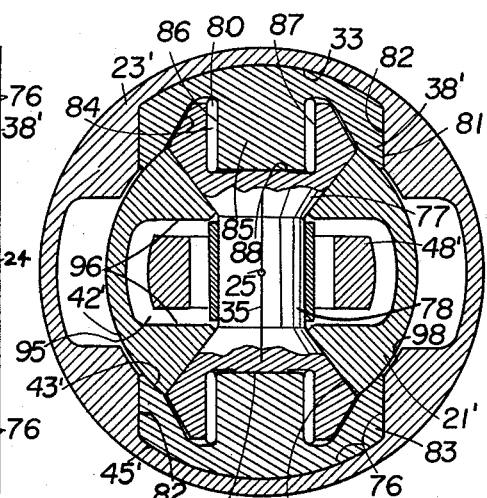
Fig. 7 is a cross-section corresponding to Fig. 6, showing the universal joint in alignment.
Figure 8:
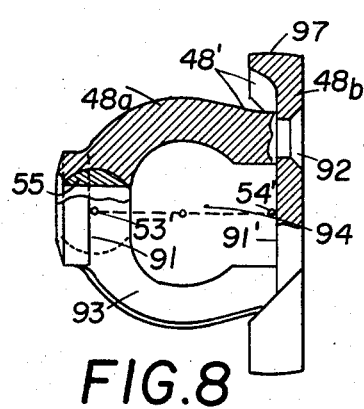
Fig. 8 shows the control part of Figures 6 and 7, partly in a section along lines 53'—54' of Fig. 6, partly in a plan view taken at right angles to said section.
Figure 9:
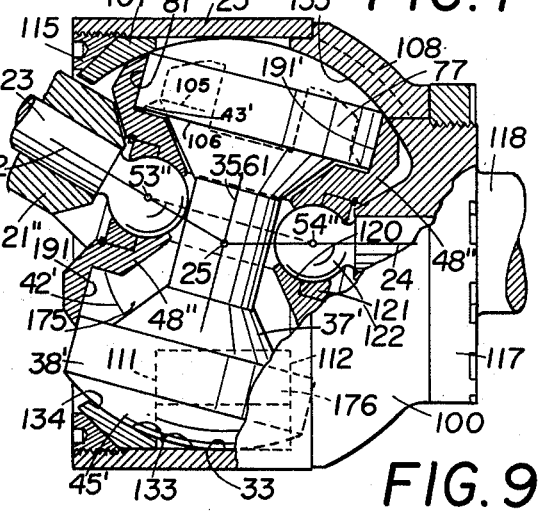
Fig. 9 is an axial section, partly a side view, of a further embodiment of the invention.
Figure 10:
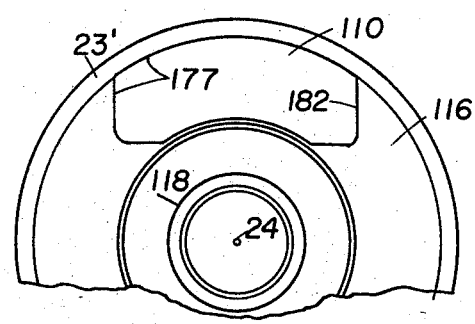
Fig. 10 is a fragmentary end view of the outer member of the universal joint shown in Fig. 9, looking left in Fig. 9.

The embodiment shown in Figures 9 and 10 is similar to the embodiment of Figures 6 to 8 in that the rolling element 77 is the same. It has the same conical rollers 37' and the same cylindrical rollers 38' of mushroom shape. But while the joint of Figures 6 to 8 is axially free, and permits free relative displacement of the two members 21', 23' along the axis 24 of member 23', the universal joint 100 of Figures 9 and 10 is axially fixed and capable of transmitting some axial pull, as is needed in some applications.

The two members connected by the universal joint are an inner member 21'' with axis 22 and an outer member 23'' with axis 24. The axes 22, 24 intersect at 25. Both members contain ways, 175, 176, each of which is symmetrical to a plane containing the axis of the respective member. The ways 175 of inner member 21'' have conical side surfaces suited for engagement with the conical rollers 37'. The ways 176 of outer member 23'' have plane sides 182 (Fig. 10) suited for engagement with the cylindrical working surfaces of the rollers 38'.

Each outer roller 38' contains a convex spherical end surface 45' for engagement with the bottom 133 of way 176. It further contains a ring-shaped tapered and concave spherical surface 43' at its opposite end, adapted to engage a spherical outside surface (42') provided on inner member 21''. As before, the spherical surfaces 43' and 45' are concentric, and their center 25 coincides with the center of the spherical outside surface 42'. As before, the two pairs of rollers have working surfaces that overlap axially, so that the plane of the outmost circle 105 of the working surface of an inner roller is closer to the adjacent end of the rolling element 77 than the plane of the inmost circle 106 of the adjacent outer roller 38'.

The universal joint 100 is kept axially fixed by the engagement of the spherical roller end-surface 45' with the bottom 133 of way 176. This bottom is composed of a central cylindrical portion 33 and of concave spherical portions 134, 135 provided on inserts 107, 108. The portions 134, 135 are parts of the same spherical surface centered at 25.

The ways 176, with their plane sides 182 and bottoms 33 parallel to axis 24, may be broached. To this end the member 23'' has a pair of openings 110 (Fig. 10) in its rear wall 116, for the broach to go through. The sides of the ways 176 terminate at the planes 111, 112 shown dotted in Fig. 9. At the left of plane 111 the inside cylindrical surface 33 is continuous, and gives support to the ring-shaped insert 107. The latter is pressed towards a shoulder at plane 111 by a nut 115 threading into member 23''. The shoulder is provided by the ends of the side portions of the ways 176. The other insert, 108, is a wide ring covering the end surface or rear wall 116 of member 23'' and reaching through the openings 110. It is securely kept in place by a nut 117 threading onto member 23'', at the right. Member 23'' is formed integral with a shaft portion 118 shown fragmentarily.

The rotatable control part 48'' may be made of two pieces rigidly secured together, as described for part 48'. It contains parallel plane side portions 191' straddling the outer rollers 38', to keep the roller axis 35 in the central plane 61. Its axis 53''—54'' is constrained to intersect the axes 22, 24 of the members 21'', 23'' at points 53'', 54'' equidistant from the central plane 61. The constraints at both points 53'', 54'' are alike. At each said point the control part 48'' contains a spherical socket portion 120 that is completed with an insert 121 rigidly secured to part 48''. The two socket portions are centered at 53'' and 54'' respectively. They engage ball ends 122 of rods 123 axially slidable in bores of the respective members 21'', 23'', so that the ball centers are movable along the axes 22, 24 respectively. The control part maintains the roller axis in the bisector plane always, so that uniform motion is transmitted.

If desired, the two members 21'', 23'' may be centered in known manner by direct contact of member 23'' with the spherical outside surface 42' of member 21''. In this case the contact at the spherical end surfaces 43', 45' of the outer rollers 38' keeps only the function of maintaining the roller axis 35 at center 25 of the spherical outside surface 42'.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

I claim:

1. A universal joint for transmitting torque between an inner member and an outer member whose axes intersect at an angle which may vary in operation, comprising said two members, said members having ways each of which is symmetrical with respect to a plane containing the axis of the respective member, a torque-transmitting element extending into diametrically opposite ways of both members and directly engaging the ways of said inner member, said element carrying a pair of parts at its outer ends mounted thereon for rotation on a common axis, for engagement with the ways of said outer member, said parts having inside spherical surface portions adapted to engage portions of a spherical outside surface provided on said inner member, said parts being wider than the ways at said outside surface so that each part overlaps said spherical outside surface in two separate zones at opposite sides of the ways, each of said parts having a spherical outside surface adapted to engage the bottom surface of the way engaged thereby, and control means for maintaining the axis of said parts in the bisector plane of the axes of said two members.

2. A universal joint according to claim 1, wherein the rotatable parts mounted at the outer ends of the torque-transmitting element are cylindrical rollers, and wherein the ways of the outer member engaged thereby have plane sides parallel to the axis of the outer member.

3. In a universal joint having an inner member and an outer member both provided with ways, a torque-transmitting element extending into diametrically opposite ways of both members, said element contacting the ways of said inner member and having a pair of parts mounted to rotate thereon on a common axis, for engagement with the ways of said outer member, each part of said pair being of mushroom shape in an axial section, said shape comprising a portion adapted to engage the ways of said outer member, a recess in said portion, and a central stem projecting from said recess for rotatably mounting said part.

4. In a universal joint, a rotatable part adapted to engage the sides of a way provided on one of the two members connected by the universal joint, an element on which said part is rotatable and which is connected to the other of said two members, said part being of mushroom shape in a plane section laid through its axis and comprising a head adapted to engage said way with an outside surface, a circular recess provided in said head, and a central cylindrical stem projecting from said recess and surrounded thereby, said element having a portion projecting into said recess and containing a bore adapted to receive said stem, said bore and said outside surface having approximately the same position lengthwise of the axis of said part to enable said stem and said outside surface to transmit evenly distributed driving load.

5. In a universal joint, a roller adapted to engage a way provided on one of the two members connected by the universal joint, and an element on which said roller is rotatable and which is connected to the other of said two members, said roller being of mushroom shape and comprising a cup-shaped portion having a cylindrical outside surface adapted to engage said way and a central stem projecting from the bottom of the cup-shaped portion, said element being adapted to receive said stem drivingly, said cylindrical outside surface and said stem having approximately the same position lengthwise of the axis of said roller, whereby the driving load between the two members of the joint is transmitted directly through said stem.

6. In a universal joint, a roller adapted to engage a way provided on one of the two members connected by the universal joint, said roller being of mushroom shape and comprising a cup-shaped portion and a central cylindrical stem projecting from the bottom of the cup shape, said roller having a cylindrical working surface adapted to engage the sides of said way, a convex spherical end surface adapted to engage the bottom of said way, and a ring-shaped concave spherical surface concentric with said convex spherical end surface.

7. A rolling element for universal joints, comprising a portion having a pair of coaxial and opposite inner rollers rigid therewith, a pair of outer rollers rotatably mounted coaxially with said inner rollers on internal portions rigid with said inner rollers, said two pairs of rollers having working surfaces that overlap axially, so that the plane of the outmost circle of the working surface of an inner roller is closer to the adjacent end of said rolling element than the plane of the inmost circle of the adjacent outer roller, said outer roller having a central stem forming the journal in the bearing that mounts it.

8. A rolling element for universal joints according to claim 7, wherein said pair of inner rollers are tapered rollers formed integral with each other, and wherein each outer roller is rotatably mounted in an internal portion integral with said inner rollers.

9. A rolling element for universal joints according to claim 8, wherein said inner rollers are conical rollers having a common apex on their axis, and wherein said inner rollers have longer profiles in axial sections than said outer rollers.

10. A rolling element for universal joints according to claim 7, wherein each of said outer rollers has a working surface and a pair of concentric spherical end surfaces, one of said end surfaces being convex and the other being concave, the latter being of ring shape.

11. In a universal joint having an inner member and an outer member both provided with ways, an element for transmitting torque between said ways, said element having a pair of tapered rollers formed integral therewith, rotatable means for controlling the inclination of said element, said control means enclosing the central portion of said element with an opening having a width smaller than the maximum diameter of said tapered rollers, so that said element and said control means are inseparable without destruction.

12. A universal joint for transmitting torque between two members whose axes intersect at an angle which may vary in operation, comprising said two members, said members having ways each symmetrical with respect to a plane containing the axis of the respective member, an element adapted to transmit torque between the ways of said members, rotatable means for controlling the inclination of said element, means for constraining the axis of said control means to intersect the axes of said two members at two spaced points, the constraint at one of said points comprising a ball centered at said one point and slidable axially on a pin rigid with and coaxial with the member whose axis passes through said one point, and a socket portion provided on said control means and pivotally engaging said ball.

13. A universal joint for transmitting torque between an inner member and an outer member whose axes intersect at an angle which may vary in operation, comprising said two members, said members having ways each symmetrical with respect to a plane containing the axis of the respective member, an element reaching into diametrically opposite ways of both members and adapted to transmit torque between the ways of said members, rotatable means for controlling the inclination of said element, said control means acting on said element through an intermediate part rotatable relatively to said element about an axis passing through the center of the universal joint at which the axes of the two members intersect, said intermediate part reaching into diametrically opposite ways of said inner member.

14. A universal joint according to claim 13, wherein said element contains a pair of coaxial tapered inner rollers rigid therewith and a pair of outer rollers coaxial with said inner rollers rotatably mounted thereon, and wherein said intermediate part is rotatable about the axis of said rollers relatively to said element.

15. A universal joint, comprising an inner member and an outer member whose axes intersect at an angle which may vary in operation, said members having ways each of which is symmetrical with respect to a plane containing the axis of the respective member, the ways of said inner member having tapered side surfaces, a torque-transmitting element extending into diametrically opposite ways of both members, said element having opposite coaxial and approximately conical surfaces rigid with one another and contacting the ways of said inner member, a pair of parts mounted to rotate at opposite ends of said element coaxially with its conical surfaces, each part of said pair being of mushroom shape in an axial section, said shape comprising a portion adapted to engage the ways of said outer member, a recess provided in said portion inwardly of its working surface, and a central stem projecting from said recess, for rotatably mounting said part on said element.

16. A universal joint according to claim 15, wherein the ways of said outer member are straight and extend parallel to the axis of the outer member.

17. A universal joint according to claim 16, wherein the ways of the outer member have plane sides, and wherein the parts mounted at opposite ends of the torque-transmitting element have cylindrical working surfaces adapted to engage said plane sides.

18. A universal joint according to claim 15, wherein the said mushroom shape also comprises a spherical end surface adapted to engage the bottom of a way of the outer member, said spherical surface being centered approximately at the longitudinal center of the torque-transmitting element.

References Cited in the file of this patent
UNITED STATES PATENTS

| | | |
|---|---|---|
| 2,036,978 | Anderson | Apr. 7, 1936 |
| 2,057,102 | Lemell | Oct. 13, 1936 |
| 2,207,980 | Greiner | July 16, 1940 |
| 2,211,388 | Salvetti | Aug. 13, 1940 |
| 2,236,839 | Salvetti | Apr. 1, 1941 |
| 2,462,700 | Wingquist | Feb. 22, 1949 |
| 2,532,434 | Wingquist | Dec. 5, 1950 |